United States Patent [19]

Kira et al.

[11] Patent Number: 4,816,946

[45] Date of Patent: Mar. 28, 1989

[54] METHOD OF MANUFACTURING THIN FILM MAGNETIC HEAD

[75] Inventors: Toru Kira, Tenri; Hidenori Yamasaki, Yamatokoriyama; Mitsuhiko Yoshikawa, Ikoma, all of Japan

[73] Assignee: Sharp Kabushiki Kaisha, Osaka, Japan

[21] Appl. No.: 110,102

[22] Filed: Oct. 15, 1987

Related U.S. Application Data

[63] Continuation of Ser. No. 554,674, Nov. 23, 1983, abandoned.

[30] Foreign Application Priority Data

Nov. 26, 1982 [JP] Japan .................................. 57-208250

[51] Int. Cl.⁴ ............................................. G11B 5/12
[52] U.S. Cl. .................................... 360/110; 360/120; 360/126; 360/127
[58] Field of Search ................. 360/110, 120, 123-127; 29/603; 427/96, 116, 240; 428/429

[56] References Cited

U.S. PATENT DOCUMENTS

| | | | |
|---|---|---|---|
| 4,219,853 | 8/1980 | Albert et al. ...................... | 360/125 X |
| 4,318,148 | 3/1982 | Kaminaka et al. .................. | 360/127 |
| 4,347,306 | 8/1982 | Takeda et al. ...................... | 427/96 |
| 4,349,609 | 9/1982 | Takeda et al. ...................... | 428/429 |
| 4,407,851 | 10/1983 | Kurosawa et al. ................ | 427/96 X |
| 4,539,616 | 9/1985 | Yuito et al. ......................... | 360/125 |
| 4,576,900 | 3/1986 | Chiang ................................ | 427/96 X |
| 4,685,104 | 8/1987 | Hanazono et al. .................. | 360/126 |

FOREIGN PATENT DOCUMENTS

| | | | |
|---|---|---|---|
| 53-36214 | 4/1978 | Japan .................................. | 360/110 |
| 53-120416 | 10/1978 | Japan .................................. | 29/603 |
| 58-9209 | 1/1983 | Japan .................................. | 29/603 |
| 58-23315 | 2/1983 | Japan .................................. | 360/110 |
| 56173245 | 5/1983 | Japan .................................. | 29/603 |
| 58-111116 | 7/1983 | Japan .................................. | 29/603 |

*Primary Examiner*—John H. Wolff
*Attorney, Agent, or Firm*—Birch, Stewart, Kolasch & Birch

[57] ABSTRACT

An improved method of manufacturing a thin film magnetic head, which includes the steps of forming an electrically conductive material coil layer on a substrate of a magnetic material, applying onto the electrically conductive material coil layer, an insulation layer of $SiO_2$, $Si_3N_4$, $Al_2O_3$ and the like by sputtering, plasma chemical vapor deposition process, etc., and further forming a coating layer of $SiO_2$ on the insulation layer by spin-coating process for flattening the upper surface of the insulation layer.

26 Claims, 2 Drawing Sheets

METHOD OF MANUFACTURING THIN FILM MAGNETIC HEAD

This application is a continuation, of application Ser. No. 554,674 filed on Nov. 23, 1983, now abandoned.

The present invention generally relates to a magnetic head and more particularly, to a method of manufacturing a thin film magnetic head superior for recording at a high density.

Figure 1:
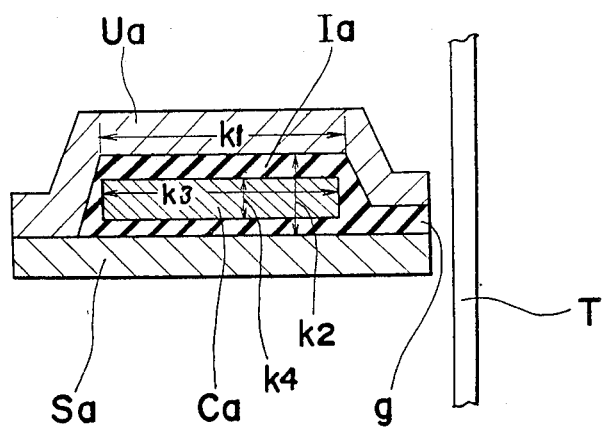

In FIG. 1, there is shown a conventional single winding thin film magnetic head which includes a magnetic substrate Sa made of a ferro-magnetic material such as Ni-Fe, Fe-Al-Si, ferrite or the like so as to constitute a lower core, an upper core Ua made of the same material as that of the substrate Sa and applied onto said substrate, and an electrically conductive material coil layer Ca disposed in a space defined between the substrate Sa and the upper core Ua through an insulation layer Ia, with a front gap g being defined at its side confronting magnetic tape T as a recording medium.

For improving the recording efficiency in the known single winding thin film magnetic head having the construction as described above, it is necessary to effectively lead the magnetic flux produced in the upper core Ua and the magnetic substrate Sa, up to the front gap g without any leakage, and for this purpose, it is desirable to reduce a core length $k_1$, and also to increase a distance $k_2$ between the upper core Ua and the magnetic substrate Sa in FIG. 1. The reduction of the core length $k_1$ may be achieved by narrowing a width $k_3$ of the conductive material coil layer Ca, while the increase of the distance $k_2$ between the upper core Ua and the magnetic substrate Sa can be attained by increasing a thickness $k_4$ of the conductive material coil layer Ca.

Figure 2:
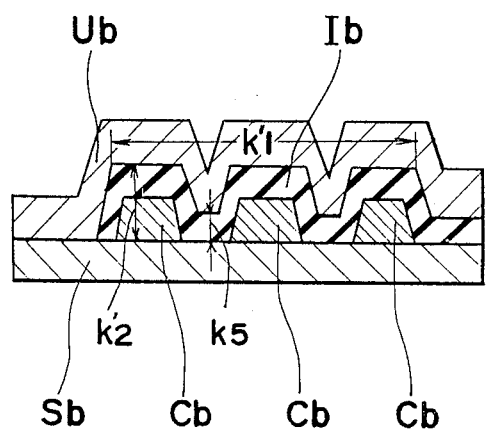

Referring further to FIG. 2 showing a construction of a conventional plural winding thin film magnetic head, a manufacturing process thereof will be described hereinbelow.

In the first step, the electrically conductive material coil layer Cb is deposited in a spiral shape, onto the magnetic substrate Sb constituting the lower core through evaporation, sputtering, etc. for processing by photo etching (In FIG. 2, four neighboring turns of the coil layer Cb are shown in section.) and then, the insulation layer Ib is applied by sputtering, chemical vapor deposition (CVD) or the like, with a subsequent application of the upper core Ub thereonto.

In the known plural winding thin film magnetic head to be manufactured by the steps as described above also, it is desirable for the improvement of the recording efficiency, to reduce the core length $k'_1$ and also to increase the distance $k'_2$ between the upper core Ub and the magnetic substrate Sb. However, in the plural winding thin film magnetic head as described above, although the distance $k'_2$ between the upper core Ub and the magnetic substrate Sb can be increased anyway by increasing the layer thickness of the conductive material coil layer Cb, since a distance $k_5$ from the upper core Ub to the magnetic substrate Sb between the respective turns of the conductive coil layer Cb is determined only by the thickness of the insulation layer Ib, there is formed a difference between the distance $k'_2$ and the distance $k_5$, thus resulting in a leakage of magnetic flux between the neighboring turns of the conductive material coil layer Cb, with a consequent reduction of the recording efficiency. Meanwhile, if the thickness of the electrically conductive material coil layer Cb is increased, the undulation or unevenness of the upper core Ub is undesirably increased, thus also giving rise to the reduction of the recording efficiency in this respect. Moreover, in the arrangement of FIG. 2, the conductive material coil layer Cb is arranged in one layer, but in the case where such conductive material coil layer Cb is piled up in a plurality of layers, the undulation of the upper core Ub is still more increased as the layers are added one upon another, and thus, difficulties may arise in the construction of the magnetic head as well as the reduction of the recording efficiency.

Figure 3:
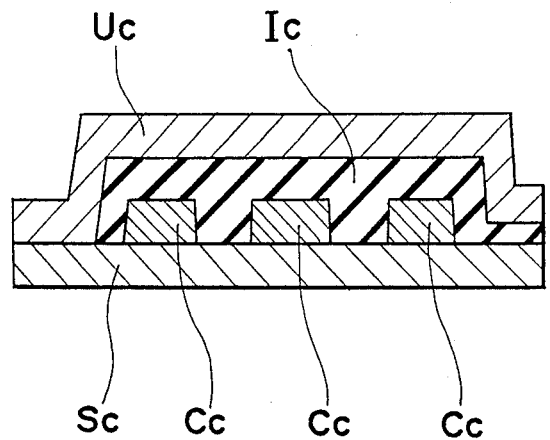

In order to eliminate the disadvantages in the construction of the conventional plural winding thin film magnetic head as described above, it is necessary to flatten the upper surface of the insulation layer Ic which covers the conductive material coil layer Cc, after formation of such coil layer Cc between the upper core Uc and the magnetic substrate Sc as shown in a plural winding thin film magnetic head with an ideal construction of FIG. 3.

Accordingly, an essential object of the present invention is to provide an improved method of manufacturing a thin film magnetic head in which an upper surface of an insulation layer provided on an electrically conductive material coil layer of the magnetic head is flattened so as to prevent leakage of magnetic flux for the improvement of recording efficiency.

Another important object of the present invention is to provide a method of manufacturing a thin film magnetic head as described above which is simple in steps and capable of efficiently producing improved thin film magnetic heads at low cost.

In accomplishing these and other objects, according to one preferred embodiment of the present invention, there is provided a method of manufacturing a thin film magnetic head, which includes the steps of forming an electrically conductive material coil layer on a substrate of a magnetic material, applying onto the electrically conductive material coil layer, an insulation layer of $SiO_2$, $Si_3N_4$, $Al_2O_3$ and the like by sputtering, plasma chemical vapor deposition process, etc., and further forming a coating layer of $SiO_2$ on the insulation layer by spin-coating process for flattening the upper surface of said insulation layer. In the above method, the thickness of the insulation layer is set to be larger than the thickness of the electrically conductive material coil layer and a distance between respective turns of the electrically conductive material coil layer formed in a spiral shape.

By the steps according to the present invention as described above, an improved method of manufacturing a thin film magnetic head has been provided, with a substantial elimination of disadvantages inherent in the conventional methods of this kind.

Figure 4:
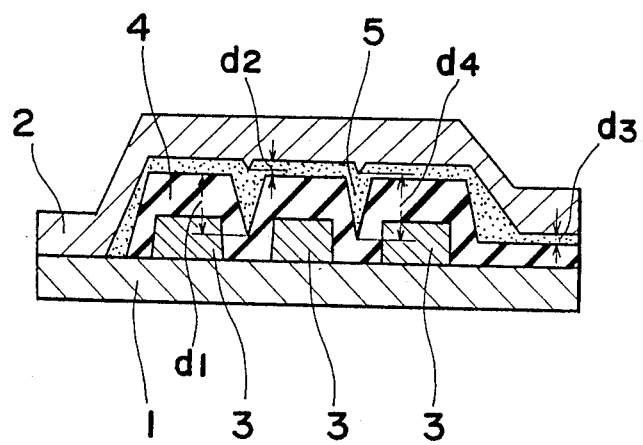

These and other objects and features of the present invention will become apparent from the following description taken in conjunction with the preferred embodiment thereof with reference to the accompanying drawings, in which;

FIG. 1 is a side sectional view showing the construction of a conventional single winding thin film magnetic head together with a magnetic tape as a recording medium (already referred to), FIG. 2 is a side sectional view showing the construction of a conventional plural winding thin film magnetic head (already referred to), FIG. 3 is also a side sectional view showing the construction of an ideal plural winding thin film magnetic head (already referred to), and FIG. 4 is a side sectional view showing the construction of an improved plural winding thin film magnetic head for explaining a manufacturing method according to the present invention.

Before the description of the present invention proceeds, it is to be noted that like parts are designated by like reference numerals throughout the accompanying drawings.

Referring now to the drawings, an improved method of manufacturing a thin film magnetic head according to the present invention will be described hereinafter.

In FIG. 4, there is shown a plural winding thin film magnetic head as produced by the manufacturing method according to one preferred embodiment of the present invention, the manufacturing steps of which will be explained in detail subsequently.

Firstly, copper is deposited by evaporation, sputtering, etc. on a magnetic substrate 1 made of a ferro-magnetic material such as Ni-Fe, Fe-Al-Si, ferrite or the like and constituting a lower core, and thereafter, is formed into an electrically conductive material coil layer 3 in a spiral configuration through processing by sputter-etching, etc. (In FIG. 4, four neighboring turns of the coil layer 3 are shown in section.) The thickness of the conductive material coil layer 3 is set to be 2 microns. Although the distance between the respective turns of the conductive material coil layer 3 in the spiral shape should preferably be as small as possible from the viewpoints of reduction of resistance of the conductive material coil layer 3, and flattening of an insulation layer 4 to be formed on said coil layer 3, it is restricted, by the limitations in the processing technique, within a range of approximately 1.5 to 2 microns, which are generally equal to the thickness of the conductive material coil layer 3, and more preferably, to about 2 microns.

Onto the electrically conductive material coil layer 3, the insulation layer 4, for example, of $SiO_2$, $Si_3N_4$, $Al_2O_3$ or the like is deposited by sputtering, plasma chemical vapor deposition (CVD), etc. In the above case, the thickness of the insulation layer 4 should be set to be larger than the thickness of the conductive material coil layer 3 and the distance between the respective turns of said coil layer 3. At this step, the step difference $d_1$ of the insulation layer 4 is approximately 3 microns so as to be larger than the step difference of 2 microns by the thickness of the conductive material coil layer 3, since the film of the insulation layer 4 is difficult to be perfectly applied into the recesses formed between the respective turns of the conductive material coil layer 3.

Thereafter, a coating material of $SiO_2$ prepared by dissolving a polymeric product of Si into a solvent such as ethanol, etc., and containing a solid content of about 12% (e.g. O. C. D. which is name used in trade and manufactured by TOKYO OHKA KOGYO KABUSHIKI KAISHA, Japan or silica glass manufactured by CHISSO CORPORATION, Japan), is dripped onto the insulation layer 4 for subsequent spin-coating at revolutions of 3000 r.p.m. so as to form a coating layer 5 of $SiO_2$ over said insulation layer 4. By the above procedure, a step difference $d_2$ of the coating layer 5 of $SiO_2$ is flattened to be less than 0.5 micron. Then, for forming the coating layer 5 into a fine-grained, i.e. compact structure, the magnetic substrate 1 thus processed is subjected to sintering at a temperature of 400° C. for approximately 30 minutes. By the above processing, the thickness $d_3$ of the coating layer 5 of $SiO_2$ at the front gap is approximately 3000Å, while the thickness $d_4$ of said layer 5 at the recess between the respective turns of the coil layer 5 becomes about 2.8 microns. Subsequently, an upper core 2 of the similar magnetic material to that of the substrate 1 is applied onto the coating layer 5 to complete the thin film magnetic head according to the present invention.

By the method of manufacturing the thin film magnetic head according to the present invention as described in the foregoing, the step difference of 2 microns due to the thickness of the electrically conductive material coil layer 3 is reduced, through the flattening processing by the coating layer 5 of $SiO_2$, to less than 0.5 micron, which is sufficient for a practical application. In the case where a further flattening processing is required, it is possible to effect a second spin-coating of the coating material of $SiO_2$, whereby the step difference $d_2$ of the coating layer 5 is flattened to be approximately 0.1 micron.

It is to be noted here that, since the coating material constituting the coating layer 5 is subjected to an internal stress produced in its film during the sintering, cracks tend to be formed at portions of the coating layer 5 where its thickness is large, but if the coating layer 5 of $SiO_2$ is formed by the spin-coating, after application of the insulation layer 4 of $SiO_2$, $Si_3N_4$ or the like onto the electrically conductive coil layer 3 as described earlier by the sputtering, plasma chemical vapor deposition (CVD), etc., the coating layer 5 is applied between the respective turns of the coil layer 5 in a long and thin groove-like configuration with a small width, and thus, crack formation at such portions may be advantageously prevented. The effect as described above may become conspicuous by setting the thickness of the insulation layer 4 to be larger than the thickness of the conductive material coil layer 3 and the distance between the respective turns of said coil layer 3. Moreover, if a coating composition of $SiO_2$ having an organic nature to a certain extent, and prepared by substituting part of oxygen in $SiO_2$ by an organic substance (e.g. silica glass -PM series, etc. which is the name used in trade and manufactured by Chisso Corporation, Japan) is employed for the formation of the coating layer 5 instead of using a perfectly inorganic $SiO_2$, the resistance against the crack formation may be improved to a large extent.

In the manufacturing method of the present invention as described so far, there may be considered a method in which the step for applying the insulation layer 4 of $SiO_2$, $Si_3N_4$, $Al_2O_3$ or the like by the plasma chemical vapor deposition (CVD) is omitted and the coating material of $SiO_2$ is directly applied onto the conductive material layer 3 for flattening, but such a method is not preferable, since a sufficient flattening can not be achieved unless the coating material $SiO_2$ is applied onto the upper surface of the insulation layer several times. According to experiments carried out by the present inventors, the coating material $SiO_2$ must be applied more than four times to reduce the step difference of the coating material layer to be less than 0.5 micron. Moreover, since the coating material $SiO_2$ is required to be applied by a plurality of times, the coating material layer 5 is undesirably increased in its thickness, and thus, crack formation during the sintering can not be avoided, even when the coating material of $SiO_2$ having the organic nature should be employed.

Furthermore, although there has also conventionally been proposed another flattening practice in which an insulation material such as polyimide resist and the like is applied by the spin coating, the method according to the present invention is superior thereto in the points as follows. More specifically, in the method according to the present invention, even when the coating material of $SiO_2$ having the organic nature to a certain extent is employed, the coating layer 5 substantially composed of the inorganic $SiO_2$ is stable, and small in the variation in quality with time. Moreover, since the coating layer 5 of $SiO_2$ is extremely high in hardness as compared with the insulation material of polyimide resist or the like, it has a stable structure as an element. Furthermore, there is such an advantage that dry etching with a favorable processing accuracy may be applied to the processing of the coating layer 5 of $SiO_2$.

It should also be noted here that, in the foregoing embodiments, although the present invention has been mainly described with reference to the thin film magnetic head having the electrically conductive material coil layer in one layer, the concept of the present invention is not limited in its application to the thin film magnetic head of the above type alone, but may readily be applied to a thin film magnetic head having a plurality of conductive material coil layers as well.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of manufacturing a thin film magnetic head, which comprises the steps of:
    forming an electrically conductive material coil layer in a spiral configuration with spiral turns onto a substrate made of magnetic material,
    applying onto said electrically conductive material coil layer an insulation layer so as to completely cover said electrically conductive material coil layer, wherein said insulation is selected from the group consisting of $SiO_2$, $Si_3N_4$, and $Al_2O_3$, and wherein said insulation is applied by a deposition process selected from the group consisting of sputtering, evaporation, chemical vapor deposition and plasma chemical vapor deposition,
    further forming a coating layer of an inorganic material on said insulation layer by a spin-coating process for flattening the upper surface of said insulation layer, and
    adding an upper core layer of magnetic material that is similar to that of said substrate to said coating layer,
    wherein the thickness of said insulation layer is set to be larger than the thickness of said electrically conductive material coil layer and larger than the distance between the spiral turns of said electrically conductive material coil layer.

2. The method of claim 1, wherein the electrically conductive material coil layer is a copper layer having a thickness of about 2 microns.

3. The method of claim 2, wherein the distance between the spiral turns of the electrically conductive material coil layer is about 1.5 to 2 microns.

4. The method of claim 1 wherein the thickness of the coating layer is flattened so as to reduce the depth of any recesses in the surface of the coating layer to be less than 0.5 microns.

5. The method of claim 1 wherein the magnetic substrate is a ferromagnetic material selected from the group consisting of Ni-Fe, Fe-Al-Si and ferrite.

6. The method of claim 1 wherein a second spin-coating of the coating layer is effected for further flattening said coating layer so that the depth of any recesses in said coating layer are about 0.1 microns in thickness.

7. The method of claim 1 wherein the coating layer is $SiO_2$.

8. The method of claim 1, wherein the insulation layer is applied to the electrically conductive material coil layer by a sputtering process.

9. The method of claim 1, wherein the insulation layer is applied to the electrically conductive material coil layer by plasma chemical vapor deposition process.

10. The thin film magnetic head as claimed in claim 9 wherein the distance between the spiral turns of the electrically conductive material coil layer is about 1.5 to 2 microns.

11. The method of claim 1, further comprising spin-coating said coating layer a second time so as to further flatten said coating layer so that the depth of any recesses in said coating layer is about 0.1 microns.

12. The method of claim 1, wherein said thin magnetic head is formed to have first and second ends, said first end being formed so that said upper core layer contacts said substrate, and said second end being formed to include a gap for confronting a recording medium wherein said gap includes exposed ends of said substrate, said insulation layer, said coating layer, and said upper core layer.

13. The method of claim 12, wherein the coating layer is $SiO_2$.

14. A thin film magnetic head which comprises:
    a substrate of magnetic material,
    an electrically conductive material coil layer formed in a spiral configuration with spiral turns on said substrate,
    an insulation layer selected from the group consisting of $SiO_2$, $Si_3N_4$, and $Al_2O_3$ applied so as to completely cover said electrically conductive material coil layer, wherein said insulation layer is applied by a deposition process selected from the group consisting of sputtering, evaporation, chemical vapor deposition and plasma chemical vapor deposition,
    a coating layer of inorganic material disposed on said insulation layer by a spin-coating process for flattening the upper surface of said insulation layer so as to prevent leakage of magnetic flux and improve recording efficiency of said thin film magnetic head, and
    an upper core layer of the same material as that of the substrate formed on said coating layer, wherein the thickness of said insulation layer is set to be larger than the thickness of said electrically conductive material coil layer and larger than the distance between the spiral turns of said electrically conductive material coil layer.

15. The thin film magnetic head as claimed in claim 14, wherein the coating layer is $SiO_2$.

16. The thin film magnetic head as claimed in claim 14, wherein the insulation layer is applied to the electrically conductive material coil layer by a sputtering process.

17. The thin film magnetic head as claimed in claim 14, wherein the insulation layer is applied to the electrically conductive material coil layer by plasma chemical vapor deposition process.

18. The thin film magnetic head as claimed in claim 14, wherein the electrically conductive material coil layer is a copper layer having a thickness of about 2 microns.

19. The thin film magnetic head as claimed in claim 14, wherein the magnetic substrate is a ferromagnetic material selected from the group consisting of Ni-Fe, Fe-Al-Si and ferrite.

20. The thin film magnetic head as claimed in claim 14, wherein a second spin-coating of the coating layer is effected for further flattening said coating layer so that the depth of any recesses in said coating layer is about 0.1 microns.

21. The thin film magnetic head as claimed in claim 14, wherein said thin film magnetic head has first and second ends, said first end being formed so that said upper core layer contacts said substrate, and said second end including a gap for confronting a recording medium wherein said gap includes exposed ends of said substrate, said insulation layer, said coating layer, and said upper core layer.

22. The thin film magnetic head as claimed in claim 21, wherein the coating layer is $SiO_2$.

23. A method of manufacturing a thin film magnetic head, which consists of essentially of the following steps:
   forming an electrically conductive material coil layer in a spiral configuration with spiral turns onto a substrate made of magnetic material,
   applying onto said electrically conductive material coil layer an insulation layer so as to completely cover said electrically conductive material coil layer, wherein said insulation is selected from the group consisting of $SiO_2$, $Si_3N_4$, and $Al_2O_3$, and wherein said insulation is applied by a deposition process selected from the group consisting of sputtering, evaporation, chemical vapor deposition and plasma chemical vapor deposition,
   further forming a coating layer of an inorganic material on said insulation layer by a spin-coating process for flattening the upper surface of said insulation layer, and
   adding an upper core layer of magnetic material that is similar to that of said substrate to said coating layer,
   wherein the thickness of said insulation layer is set to be larger than the thickness of said electrically conductive material coil layer and larger than the distance between the spiral turns of said electrically conductive material coil layer.

24. The method of claim 21, wherein said thin magnetic head is formed to have first and second ends, said first end being formed so that said upper core layer contacts said substrate, and said second end being formed to include a gap for confronting a recording medium wherein said gap includes exposed ends of said substrate, said insulation layer, said coating layer, and said upper core layer.

25. A thin film magnetic head which consists essentially of:
   a substrate of magnetic material,
   an electrically conductive material coil layer formed in a spiral configuration with spiral turns on said substrate,
   an insulation layer selected from the group consisting of $SiO_2$, $Si_3N_4$, and $Al_2O_3$ applied so as to completely cover said electrically conductive material coil layer, wherein said insulation layer is applied by a deposition process selected from the group consisting of sputtering, evaporation, chemical vapor deposition and plasma chemical vapor deposition,
   a coating layer of inorganic material disposed on said insulation layer by a spin-coating process for flattening the upper surface of said insulation layer so as to prevent leakage of magnetic flux and improve recording efficiency of said thin film magnetic head, and
   an upper core layer of the same material as that of the substrate formed on said coating layer, wherein the thickness of said insulation layer is set to be larger than the thickness of said electrically conductive material coil layer and larger than the distance between the spiral turns of said electrically conductive material coil layer.

26. The thin film magnetic head as claimed in claim 25, wherein said thin film magnetic head has first and second ends, said first end being formed so that said upper core layer contacts said substrate, and said second end including a gap for confronting a recording medium wherein said gap includes exposed ends of said substrate, said insulation layer, said coating layer, and said upper core layer.

* * * * *